United States Patent [19]

Hofbauer et al.

[11] 4,392,394
[45] Jul. 12, 1983

[54] ENGINE-GEAR ARRANGEMENT FOR VEHICLES, IN PARTICULAR PASSENGER CARS

[75] Inventors: Peter Hofbauer; Romanus Scholz; Paulus Heidemeyer, all of Wolfsburg; Frank Zimmermann, Braunschweig, all of Fed. Rep. of Germany

[73] Assignee: Volkswagenwerk Aktiengesellschaft, Wolfsburg, Fed. Rep. of Germany

[21] Appl. No.: 203,803

[22] Filed: Nov. 3, 1980

[30] Foreign Application Priority Data

Nov. 7, 1979 [DE] Fed. Rep. of Germany ....... 2944928

[51] Int. Cl.³ .............................................. F16H 37/08
[52] U.S. Cl. ........................................ 74/689; 74/695; 74/740; 74/785
[58] Field of Search .................. 74/689, 695, 740, 785

[56] References Cited

U.S. PATENT DOCUMENTS

| | | | |
|---|---|---|---|
| 3,029,662 | 4/1962 | Hause | 74/695 |
| 3,442,346 | 5/1969 | Winter et al. | 74/689 X |
| 3,861,485 | 1/1975 | Busch | 74/689 X |
| 4,136,581 | 1/1979 | Winter | 74/689 |
| 4,290,320 | 9/1981 | Abbott | 74/689 |

Primary Examiner—George H. Krizmanich
Attorney, Agent, or Firm—Brumbaugh, Graves, Donohue & Raymond

[57] ABSTRACT

A system for driving a motor vehicle with a infinitely variable belt gear is provided with an engine transversely positioned to the longitudinal direction of the vehicle. First and second drive-cone pulleys are provided for transmitting the rotational force of the engine. A clutch couples the engine with the drive-cone pulleys. A V-belt or chain drivingly connects the first and second output cone pulleys with the first and second drive-cone pulleys. A planetary gear drive with a sun gear, a ring gear, and a planetary gear carrier carrying planet gears is driven by the first and second output cone pulleys. A differential gear for driving the axles of the vehicle is coaxially positioned to the planetary gear with a drive gear coupling the differential gear with the planetary gear.

8 Claims, 2 Drawing Figures

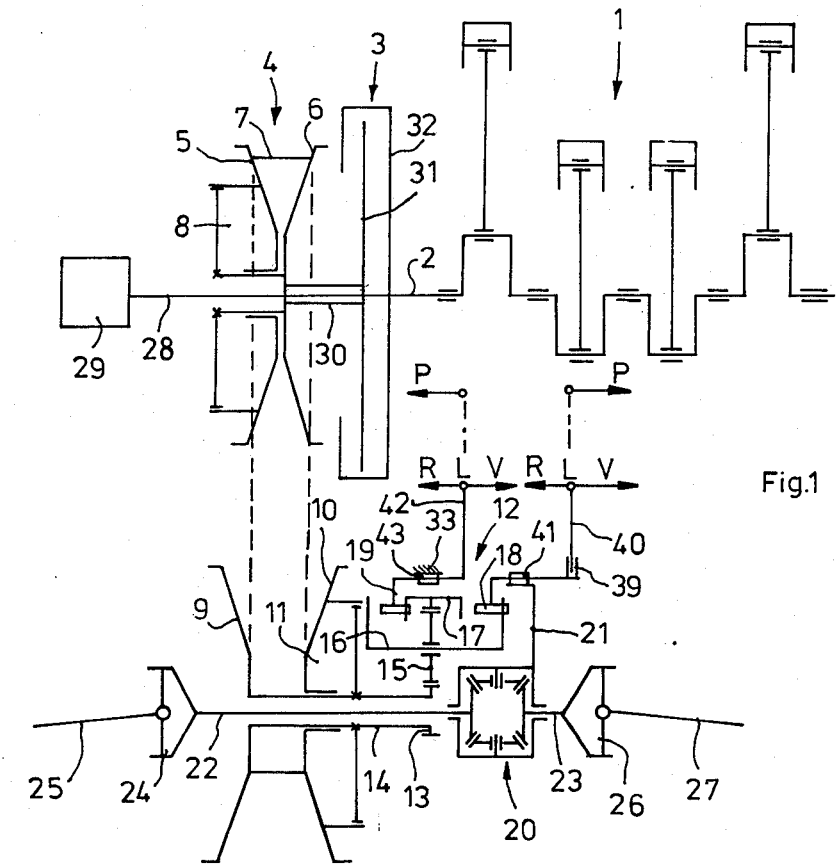
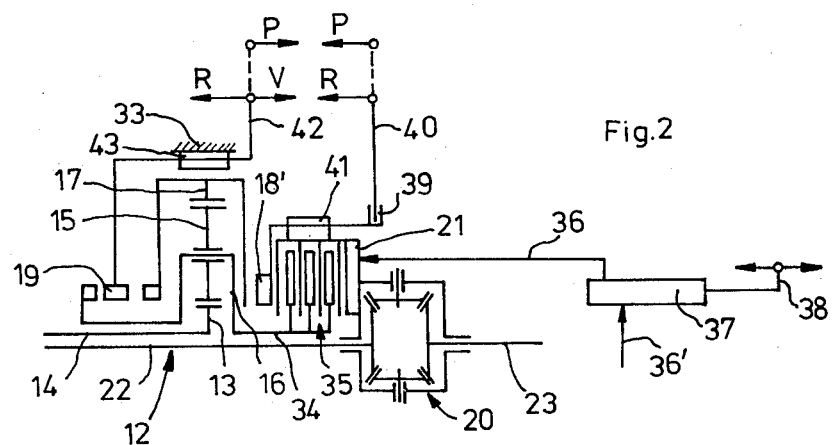

ENGINE-GEAR ARRANGEMENT FOR VEHICLES, IN PARTICULAR PASSENGER CARS

BACKGROUND OF THE INVENTION

This invention relates to an engine-gear arrangement for vehicles, and more particularly, to passenger cars with an infinitely variable belt gear.

Present demand for more efficient automobiles has brought about the development of small passenger vehicles in which the engine is transversely mounted at the front of the vehicle. Various transmission arrangements have been proposed which connect the engine to the wheels of the vehicle. Such arrangements include automatic transmissions.

Automatic transmissions heretofore used in small displacement vehicles have been expensive and unnecessarily complex. The cost of such transmissions has limited their use in small vehicles. Accordingly, a need thus exists for an inexpensive automatic transmission which can be used in a small vehicle.

SUMMARY OF THE INVENTION

In accordance with the invention, a transversely positioned engine is connected through a clutch to the drive cone pulleys of a belt gear. An important aspect of the present invention resides in the use of a transversely mounted engine in combination with a belt gear and a simple planetary gearing system whereby the planetary gearing system drives both the axle transmission and the reverse drive. The output cone pulleys of the belt gear are followed by the planetary gearing system, which is composed of a planetary gear set with a sun gear, a ring gear, and planet gears. The output of the planetary gearing system can be connected with the input of a concentrically arranged differential gear. Such an arrangement is advantageous because only two main centers of rotation are present, namely, the crankshaft, the disconnecting clutch, and the drive cone pulleys, on the one hand, and the output cone pulleys with the planetary gearing system, the differential gear and the universal shafts to the driving wheels, on the other. In this manner, various advantages are available with respect to structural effort and transmission losses. The traction organ composed, e.g., of a chain or a V-belt and used in the belt wrap gear, serves at the same time as a transmission organ from one center of rotation to the other and, by the free choice of its length, facilitates a simple variation of the center distance.

A belt wrap gear can be provided with a pre-reduction of the drive ratio. For example, a reduction ratio in the range from 1:1 to 1.3:1, preferably 1.25:1, can decrease the axle transmission of the planetary gearing system, and, moreover, create sufficient radial space for the passage of one of the axle driving shafts through the center of rotation of the axle-side cone pulleys of the belt wrap gear. One embodiment of the invention, moreover, keeps the axial distance between the flange plane of the driving engine and the output joint on the side of the axle shaft passing through the output cone pulleys comparatively short, which is advantageous for smaller automobiles. Altogether, an engine-gear arrangement can be constructed in this manner which offers the luxury of an automatic transmission for smaller vehicles, while keeping the construction effort and cost low.

In accordance with the present invention, the sun gear of the planetary gearing system is provided with a hollow shaft arranged concentrically with an output shaft of the differential gear and is connected with the output cone pulleys of the belt gear. A drive gear constitutes the input of the differential gear and can be connected by means of a first controllable clutch device with the planetary-gear carrier or the ring gear of the planetary gear system. A second controllable clutch device can be provided which connects the ring gear of the planetary-gear carrier with the stationary housing. In this manner, the planetary-gear carrier and the ring gear can be interchangeably connected with the output of the housing so that the forward drive or the reverse drive can be actuated. Inasmuch as such a change from forward to reverse occurs only at a stop, non-synchronised gearing, such as sliding sleeves, can be used. However, in order to attain more convenient shifting, i.e., in case of small residual speed or residual moment, synchronized clutches and multiple disc clutches or the like may be utilized at greater cost. The two clutch devices can also be set to act on a fixed element of the planetary gear system to provide a mechanical parking lock.

The first clutch device can be provided with a sliding sleeve connecting the drive gear of the differential gear with the ring gear of the planetary gear system for reverse drive operation. The drive gear of the differential can be connected to the planetary gear carrier by disconnecting the clutch for forward drive. Through such a clutch arrangement, an energy-saving overrunning operation is possible during engine-braking operations and idling of the vehicle.

The first disconnecting clutch arranged between the engine and the belt wrap gear is designed as an automatic starting clutch so that clutch actuation is unnecessary to change the transmission ratio or to start the vehicle.

BRIEF DESCRIPTION OF THE DRAWINGS

A more complete understanding of the present invention, together with the various advantages, will be apparent from the following Detailed Description taken in conjunction with the accompanying drawings in which:

FIG. 1 is a diagram of an engine-gear arrangement in accordance with the present invention wherein the clutch devices associated with the planetary gear system are constituted by mechanical sliding sleeves; and FIG. 2 is an embodiment of the planetary gear system portion of the present invention wherein the first clutch device is composed of a sliding sleeve and a first servo power-actuated disconnecting clutch.

DETAILED DESCRIPTION

In FIG. 1 of the drawing, 1 designates a driving engine, e.g., a four-cylinder reciprocating piston engine, whose crankshaft 2 is connected by means of a first clutch 3 with the drive cone pulleys 5, 6 of a belt wrap gear 4. Numeral 7 designates the traction organ, such as a V-belt or a chain, which transmits the torque of the engine 1 to the output cone pulleys 9, 10 of the belt wrap gear 4. Numeral 8 designates the control motor, operating, e.g., hydraulically, for mutual displacement of the pair of drive cone pulleys 5, 6. Numeral 11 designates the hydraulic control motor associated with the output cone pulley pair 9, 10.

Numeral 12 indicates a planetary gear system connected to the belt wrap gear 4. It is composed of a simple planetary gear set which is designed as an axle transmission and reversing gear. A sun gear 13 of the planetary gear system 12 is connected via a hollow shaft 14 with the output cone pulleys 9, 10 of the belt wrap gear 4. The sun gear 13 meshes with the planet gears 15 supported by a planetary-gear carrier 16. Planet gears 15 mesh with an inner-toothed ring gear 17. Numeral 18 is a first clutch designed as a simple jaw clutch coupling in the exemplary embodiment. Clutch 18, which is preferably a sliding sleeve and will hereinafter be referred to as a sleeve, connects the drive gear 21 of a successive differential gear 20 with either the planetary-gear carrier 16 or the ring gear 17 of the planetary gearing system 12. As shown in FIG. 1, the sleeve 18 engages the planetary-gear carrier 16 and connects the planetary-gear carrier 16 to the drive gear 21 through a bearing 41 on the drive gear. When the sleeve 18 is moved to the left, it engages the ring gear 17 and connects the ring gear 17 to the drive gear 21 through the bearing 41. A second clutch 19, which is preferably a sliding sleeve and will hereinafter be referred to as a sleeve, connects the ring gear 17 or the planetary gear carrier 16 with the stationary housing 33. As shown in FIG. 1, the sleeve 19 engages the ring gear 17 and connects the ring gear 17 to the stationary housing 33 through a bearing 43 on the stationary housing. When the sleeve 19 is moved to the left, it engages the planetary-gear carrier 16 and connects the planetary-gear carrier 16 to the stationary housing 33 through the bearing 43. The sleeves 18 and 19 are typically provided with teeth which mesh with corresponding teeth on the part to be engaged.

Axle shafts 22 and 23 lead from the differential gear 20 and, by way of articulations 24 and 26, connect with the articulated shafts 25 and 27 leading to the wheels.

Hydraulic pump 29 is driven by shaft 28 connected to the crankshaft 2 and powers, e.g., the adjustment means 8 and 11 for the drive and output cone pulleys of the belt wrap gear 4. In the illustrated embodiment, the shaft 28 passes centrally through the hollow shaft 30 constituting the connection of the drive cone pulleys 5, 6 with the driving plate 31 of the first disconnecting clutch 3 and is connected directly with the coupling or flywheel plate 32 driven by the crankshaft 2.

A fork 39 engaged by control lever 40 actuates a first sliding sleeve 18 which moves in a bearing 41 on the drive gear 21. Actuation of the second operating sleeve 19 can be realized in a simple manner insofar as the sleeve 18 slides in a bearing 43 of the stationary housing 33, and is rigidly connected with a control lever 42. In the position shown in the drawing, the forward drive is engaged whereby the ring gear 17 engages the control sleeve 19 and is rigidly connected with the housing 33. The planet-gear carrier 16 is connected by means of the control sleeve 18 with the drive gear 21 of the differential gear in a torsion-resistant manner. Control levers 40 and 42 may be displaced to the left from the illustrated center position, wherein the operating sleeves fully release the control elements of the planetary gear system. On further displacement to the left, the control sleeve 18 connects the drive gear 21 of the differential gear 20 with the ring gear 17 of the planetary gear system 12. On further displacement to the left, the second control sleeve 19 fixes the planetary gear carrier 16 through connection with the housing. This results in the reverse operation of the vehicle. To engage the forward drive as well as the reverse drive, the control levers 40 and 42 each are actuated in the same direction.

Actuation of the control levers in opposite directions results in a parking lock since the two control sleeves act on the like element of the planetary gear system. In this position, the drive gear 21, and with it the driving wheels of the vehicle, are connected either via the planetary gear carrier 16 or via the ring gear 17 of the planetary gear system 12 directly with the stationary housing 33.

As shown in FIG. 1, the sliding sleeves 18, 19 take the shape of non-synchronized controllable engaging teeth. The vehicle must come to a stop for shifting from the forward into the reverse drive in such an embodiment. In an alternate embodiment, shifting can be improved by using synchronized clutches or brakes. FIG. 2 shows an embodiment wherein the sliding sleeve 18' is employed only for engagement of the reverse drive and possibly for a parking lock. In the parking lock position, the drive gear 21 of the differential gear 20 is connected with the ring gear 17 of the planetary gear system 12. However, during forward operation, a servo power-operated hydraulic multi-disc clutch 35 connects the drive gear 21 with a web 34 of the planetary-gear carrier 16. Such a clutch, which can be acted on by oil pressure through a control element 37 over a line 36 as a function of the position of a control (shift) lever 38, provides a relatively low-fuel consumption overrun operation through opening of the clutch 35, e.g., during engine-braking of the vehicle. Overrun operation can also be achieved by a corresponding actuation of the disconnecting clutch 3. However, in such a case, the rotating wheels will also drive the planetary gear system 12 and the belt wrap gear 4. In still another embodiment of the present invention, a special, servo power-operated disconnecting clutch is accommodated in the gear portion formed by the hollow shaft 14. This arrangement transmits only the torques occurring before the drive axle.

The multi-disc clutch 35 indicated in FIG. 2 can be designed in such a fashion that it is continuously engaged by the oil pressure delivered over the line 36 during the driving operation. Alternatively, it can be closed by means of plate springs and opened by oil pressure only for the reverse drive and idling. In the latter case, the multiple-disc clutch 35 can also be used for the engagement of a parking lock. In parking lock, the second sliding sleeve 19 is actuated in such a manner that it connects the planetary-gear carrier 16 with the housing 33. A parking lock can also be achieved with sliding sleeve 18' and 19 acting on the ring gear 17 of the planetary gear system 12.

The control of the belt wrap gear 4 is well-known to those of skill in the art and may be a hydraulic or mechanical means. The engagement of the cone pulleys against the V-belt or the chain 7 can also be optimized.

As mentioned above, the clutch 3 may be designed also as an electronically controlled starting clutch in which the operator does not have to actuate the clutch to start the vehicle. Electronic starting clutches of this kind which are actuated, e.g., either hydraulically or pneumatically have been disclosed, e.g., by U.S. Pat. Nos. 4,295,551 and 4,331,226. Such a starting clutch may be constructed so that the clutch is the multiple-disc clutch 35 employed as an overrunning clutch at certain operating states, e.g., on extended downward travel.

A starting clutch of the aforedescribed kind may also be arranged on the output side. In such an embodiment, a more favorable position may be attained by using the clutch simultaneously as an overrunning clutch. Furthermore, the distance of the engine flange from the axle shaft articulation, which must be considered critical in transverse arrangements of the engine-gear aggregate, can then be further shortened. However, in this embodiment a larger torque will result for the starting clutch. The torque of the crankshaft would have to be added to the torques of the drive and output cone pulleys. The drive cone pulleys can also be designed as flywheel masses in order to improve the degree of non-uniformity of the internal combustion engine.

A hydrodynamic torque converter or a centrifugal clutch can also be utilized in place of the clutch 3, as is evident to those of skill in the art.

Altogether, the engine-gear arrangement proposed by the invention results in a very compact and simple construction which facilitates the utilization of automatic transmissions for small vehicles with transversely mounted engines. The disconnecting clutch arranged between the engine and the gear can be an automatically controlled starting clutch. Alternatively, however, such a clutch can be embodied as a hydrodynamic clutch.

While more than one embodiment of the present invention has been described in detail herein and shown in the accompanying drawings, it will be evident that various further modifications are possible without departing from the spirit and scope of the invention.

We claim:

1. A system for driving a motor vehicle with an infinitely variable belt gear comprising:
    an engine transversely positioned to the longitudinal direction of said vehicle;
    first and second drive cone pulleys for transmitting the rotational force of said engine;
    clutch means for coupling said engine to said drive cone pulleys;
    first and second output cone pulleys drivingly connected to said first and second drive cone pulleys;
    a planetary gear drive with a sun gear, a ring gear, and a planetary gear carrier carrying planet gears, said sun gear being driven by said first and second output cone pulleys;
    a differential gear coaxially positioned to said planetary gear drive for driving the axles of said vehicle with a drive gear coupling said differential gear with said planetary gear drive;
    a hollow shaft concentric with an output shaft of said differential gear drivingly disposed between said sun gear and said output cone pulleys;
    first controllable clutch means for selectively engaging said drive gear and said ring gear or said drive gear and said planetary gear carrier;
    a stationary housing; and
    second controllable clutch means for selectively coupling said housing to said ring gear or said housing to said planetary gear carrier.

2. The system in claim 1 wherein:
    said first controllable clutch means engages the drive gear of said differential gear with said planetary gear carrier and said second controllable clutch means engages said ring gear and said stationary housing for forward drive; and
    said first controllable clutch means engages said drive gear with said ring gear and said second controllable clutch means engages said planetary gear carrier with said stationary housing for reverse drive.

3. The system in claim 2 and further comprising a parking lock wherein:
    said first controllable clutch means and said second controllable clutch means couple said drive gear and said stationary housing, respectively, with the same element of the planetary gear drive.

4. The system in claim 2 or 3 wherein said first and second controllable clutch means comprise at least two sliding sleeves for meshing with a plurality of teeth.

5. The system in claim 2 wherein said first controllable clutch means comprises a sliding sleeve for engaging said drive gear with said ring gear for reverse drive and a servo-actuated disconnecting clutch for engaging said drive gear with said planetary gear carried for forward drive.

6. The system in claim 1 wherein said clutch means comprises an automatic starting clutch.

7. The system in claim 1 wherein said variable belt gear has a reduction ratio of about 1:1 to 1.3:1.

8. The system in claim 1 wherein said variable belt gear has a reduction ratio of about 1.25:1.

* * * * *